UNITED STATES PATENT OFFICE.

THOMAS A. EDISON, OF MENLO PARK, NEW JERSEY.

MANUFACTURING CARBONS FOR ELECTRIC LAMPS.

SPECIFICATION forming part of Letters Patent No. 242,900, dated June 14, 1881.

Application filed November 5, 1880. (No model.)

*To all whom it may concern:*

Be it known that I, THOMAS A. EDISON, of Menlo Park, in the county of Middlesex and State of New Jersey, have invented a new and useful Improvement in the Art of Manufacturing Carbons for Electric Lamps, (Case No. 256;) and I do hereby declare that the following is a full and exact description of the same.

The object of this invention is to furnish a method or process by which pure and flexible carbon may be manufactured in any desired shape, which method is particularly applicable to the manufacture of carbon conductors for incandescent electric lamps.

Thin sheet metal which will stand high temperatures—for instance, sheet nickel or cobalt—is cut or formed into the proper shape desired for the finished carbon. One or several such formed pieces of metal are suspended in a closed flask, which is then heated to a high temperature. While in this heated condition the vapor of a hydrocarbon is passed through the flask, with the result that the carbon is deposited upon the metal shapes. For this purpose the vapor of the bisulphide of carbon, the chloride of carbon, the volatile paraffine, or naphtha is preferable. The vapor is passed through the flask until a sufficient thickness of carbon has been deposited upon the forms, when the flask is allowed to cool. When cool the carbon-coated metal plates are immersed in some acid having an affinity for the metal used, and the metal thereby eaten away, leaving the pure carbon in the desired shape.

This process is especially applicable to the manufacture of carbons for incandescent electric lamps, in which case, if desired, the metal used may be in the shape of wire or ribbon bent into the proper form, or may be cut from a sheet, as before described.

What I claim is—

The improved method herein described of forming carbon in definite shape, consisting in depositing the carbon upon a metallic blank, and then removing the metallic portion by immersing the whole in a bath of acid capable of dissolving the metal, substantially as described.

This specification signed and witnessed this 21st day of October, 1880.

THOS. A. EDISON.

Witnesses:
CHAS. BATCHELOR,
WM. CARMAN.